United States Patent [19]
Allen et al.

[11] Patent Number: 6,029,199
[45] Date of Patent: Feb. 22, 2000

[54] COMPUTING SYSTEM HAVING A SYSTEM SUPERVISOR AND A COLLECTION OF COMPUTING SUBUNITS EACH OF WHICH HAS A SUBUNIT SUPERVISOR

[75] Inventors: Mark John Allen, Potsdam; Richard Ian Kaufman, Somers; Jeffrey Joseph Kleikamp, Saugerties; Lawrence Shungwei Mok; Ismail Cevdet Noyan, both of Yorktown Heights; Roger Alan Pollak, Pleasantville; Ricky Allen Rand, Somers; Arthur Robert Williams, Croton-on-Hudson, all of N.Y.

[73] Assignee: International Business Machines Corporation, Armonk, N.Y.

[21] Appl. No.: 08/681,153

[22] Filed: Aug. 16, 1996

Related U.S. Application Data

[63] Continuation of application No. 07/965,505, Oct. 23, 1992, abandoned.

[51] Int. Cl.[7] ........................................ G06F 15/16
[52] U.S. Cl. ............................. 709/224; 713/330
[58] Field of Search .................. 395/820, 825, 395/835, 200.38; 364/131, 132, 137, 138, 187, 528.21, 528.34; 709/208, 222, 224, 227; 710/10, 15, 110, 103; 712/31, 29; 702/60; 340/825.06; 713/1, 330, 340, 300; 307/66; 714/2, 47, 39

[56] References Cited

U.S. PATENT DOCUMENTS

| | | |
|---|---|---|
| 4,413,319 | 11/1983 | Schultz et al. ........................ 710/30 |
| 4,516,199 | 5/1985 | Frieder et al. ........................ 710/20 |
| 4,701,845 | 10/1987 | Andreasen et al. ................... 714/31 |
| 4,858,101 | 8/1989 | Stewart et al. ...................... 364/131 |
| 4,918,589 | 4/1990 | Floro et al. ......................... 364/132 |
| 4,964,065 | 10/1990 | Hicks et al. ........................ 709/226 |
| 5,012,180 | 4/1991 | Dalrymple et al. ................. 324/73.1 |
| 5,019,717 | 5/1991 | McCurry et al. .................... 307/66 |
| 5,113,496 | 5/1992 | McCalley et al. ................... 710/126 |
| 5,121,500 | 6/1992 | Arlington et al. ................... 713/330 |
| 5,225,974 | 7/1993 | Mathews et al. ................ 364/140.01 |
| 5,283,869 | 2/1994 | Adams et al. ...................... 709/237 |
| 5,287,537 | 2/1994 | Newmark et al. .................... 712/29 |
| 5,317,697 | 5/1994 | Husak et al. ....................... 710/103 |

Primary Examiner—John A. Follansbee
Attorney, Agent, or Firm—Daniel P. Morris; Anne Vachon Dougherty

[57] ABSTRACT

The present invention is directed to a computing system which contains a plurality of subunits. Each subunit contains a computing subcomponent and a subunit supervisor subcomponent. The subunit supervisor component monitors functions of the subunit and output signals corresponding to the monitored functions. The plurality of subunits are contained within a housing. The housing contains a housing supervisor subunit which receives the output signals of each of the plurality of subunits. The supervisor subunit outputs the accumulated signals to an input/output device for monitoring the plurality of subunits and for sending commands to each subunit.

12 Claims, 9 Drawing Sheets

COMPUTING SYSTEM HAVING A SYSTEM SUPERVISOR AND A COLLECTION OF COMPUTING SUBUNITS EACH OF WHICH HAS A SUBUNIT SUPERVISOR

This is a continuation of application Ser. No. 07/965,505, filed Oct. 23, 1992, now abandoned.

FIELD OF THE INVENTION

The present invention is directed to a supervisor system for a computing system which contains a plurality of CPUs. Each CPU is contained within a subunit or node which has a node supervisor component. The node supervisor component monitors functions of the subunit and output signals corresponding to the monitored functions. The plurality of subunits are contained within a housing. The housing contains a housing supervisor subunit which receives the output signals of each of the plurality of subunits. The housing supervisor subunit outputs the accumulated signals to an input/output device for monitoring the plurality of subunits and for providing inputs to each of the computing subunits.

BACKGROUND OF THE INVENTION

Currently, there are a large number of users that are forming computer clusters, throughput systems, or small parallel systems by linking together stand-alone workstations (nodes). Such installations are also called farms. Installation and maintenance of these farms are not without problems. They usually consume a large amount of floor space. The signal and power cabling (due to the large number of interconnects between machines) are complex. Even turning the system on is a time consuming chore due to the individual on-off switches in each node.

A computing system requires many components to make it function. While the processing engine is the central component, there are a number of auxiliary functions that are necessary for normal, and maintenance operations. These functions include: CPU reset and mode selection, power control, thermal environment control, diagnostic control and monitoring, communication with a system operator console. Simply connecting multiple computing engines in a cluster arrangement does not allow for these system level abilities. There are hardware connections to the processing engine and control consoles that must be made for control and monitoring. Furthermore, in a cluster arrangement (or farm) of computing machines, it would be necessary for the system operator to be physically present at each machine to perform the operator front panel functions, including diagnostic execution. With the supervisor functions of the present invention, all this may be performed from a single, remote location.

SUMMARY OF THE INVENTION

It is an object of the present invention to provide a supervisor system for a collection of computing subunits.

It is another object of the present invention to provide a supervisor system which provides system level functions to the collection of computing subunits which permits functionality beyond the functionality of a single computing subunit.

It is a further object of the present invention to provide a supervisor system for the control and monitoring of the entire system environment.

It is yet another object of the present invention to provide a supervisor system which permits centralized control of each individual computing subunit.

It is still another object of the present invention to provide a supervisor system which permits invoking diagnostic procedures from a centralized control system.

A broad aspect of the present invention is a supervisor control system for a collection of computing subunits. The system provides output to an output device at which data corresponding to the accumulating signals can be displayed and at which inputs can be provided to provide inputs to each subunit.

A more particular aspect of the present invention is a computing system having a plurality of subunits each of which is contained in a housing. Each of the subunit contains a subunit supervisor subcomponent which monitors internal functioning of the subunit within which it is contained and generates signals corresponding thereto. The housing contains a housing supervisor subunit which receives inputs from each of the subunit supervisor subcomponents. The housing supervisor subunit accumulates the signals and outputs the signals to an input/output device.

In another more particular aspect of the present invention, the inputs to each subunit can be provided from the input/output device.

BRIEF DESCRIPTION OF THE DRAWINGS

These and other objects, features and advantages of the present invention will become apparent upon a consideration of the following detailed description of the invention, when read in conjunction with the figures, in which:

FIG. 1, comprised of the components illustrated in FIGS. 1A and 1B, which are connected as shown in the composite FIG. 1 at the left of FIG. 1B, is a schematic diagram of the system according to the present invention.

DETAILED DESCRIPTION

Figures 1, 1B:
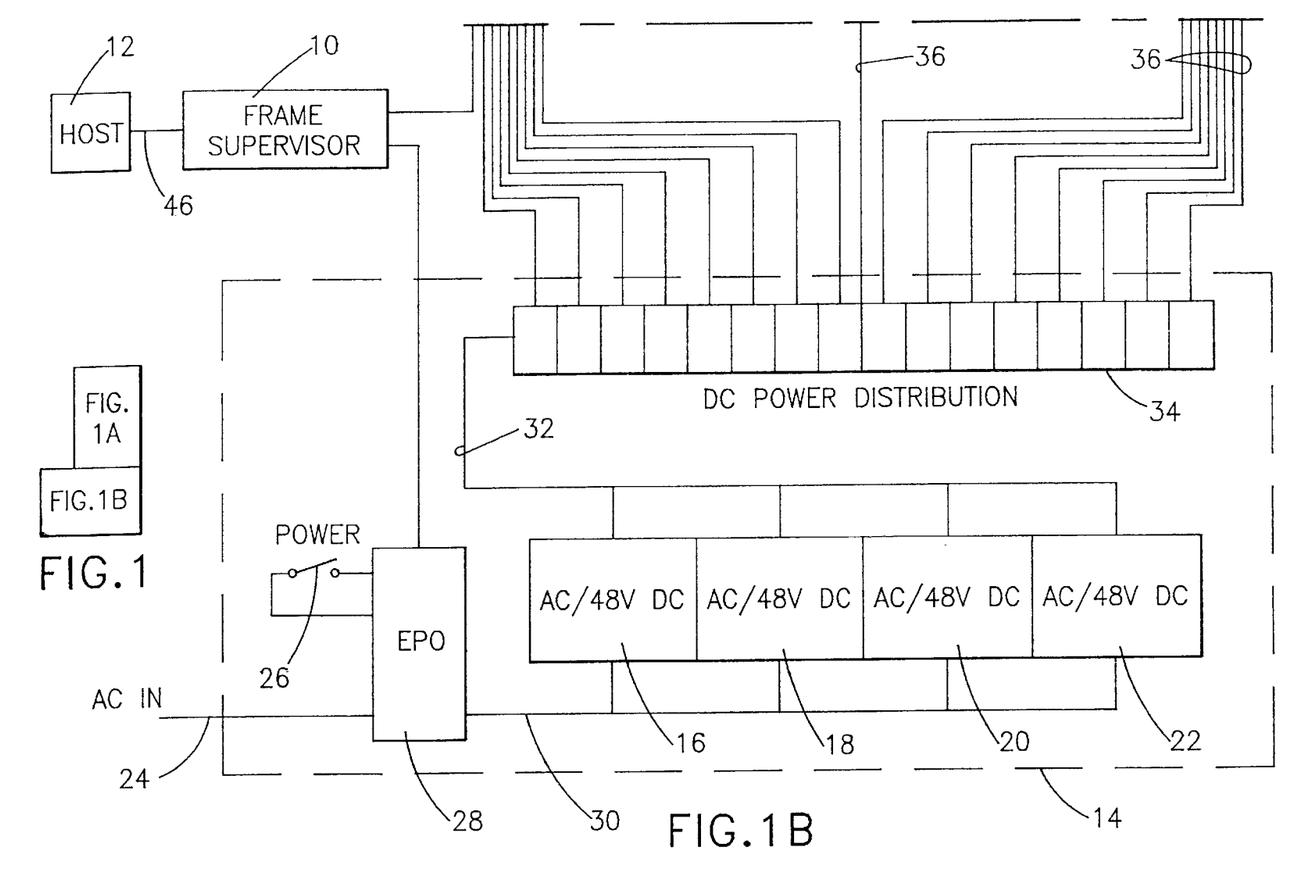
Figure 1A:
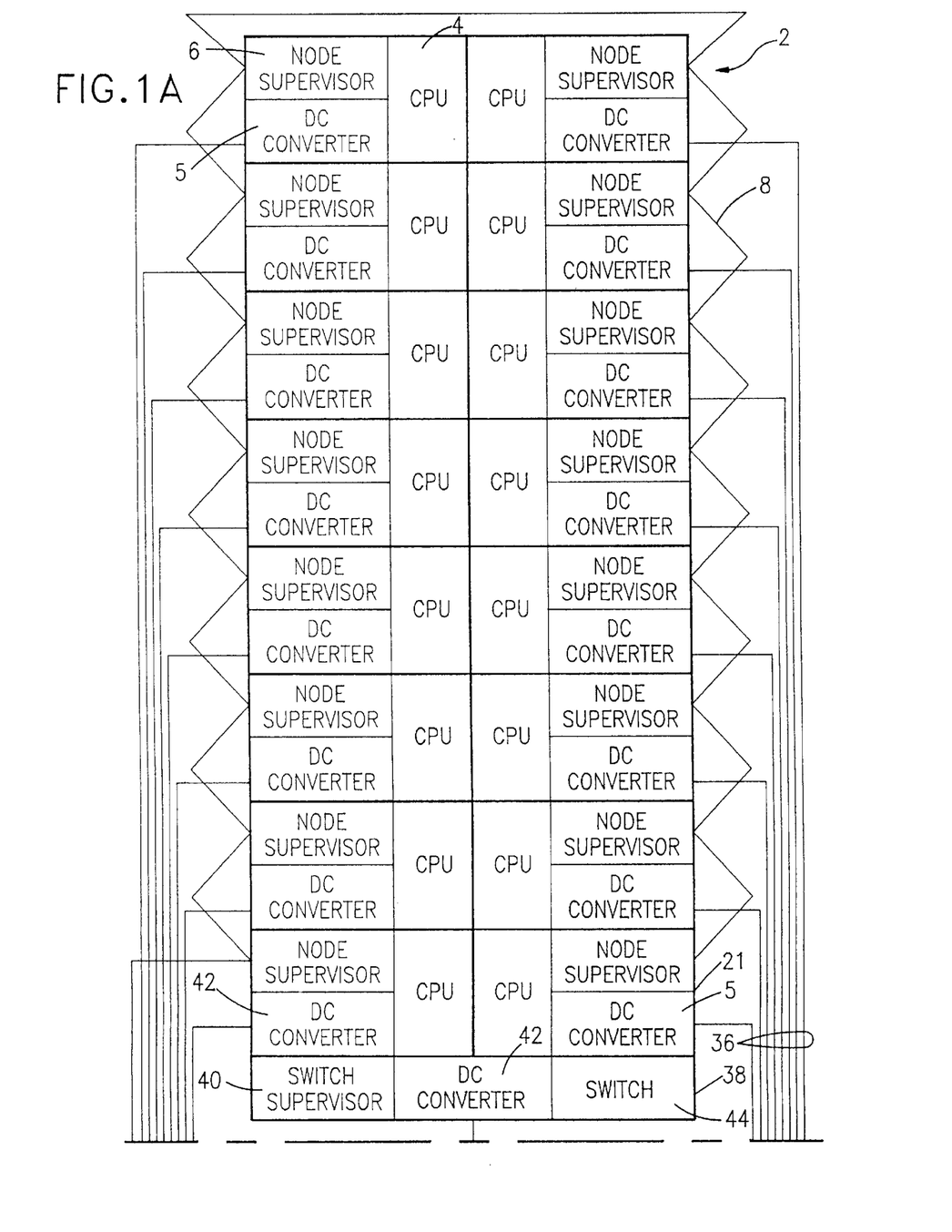
Figure 2:
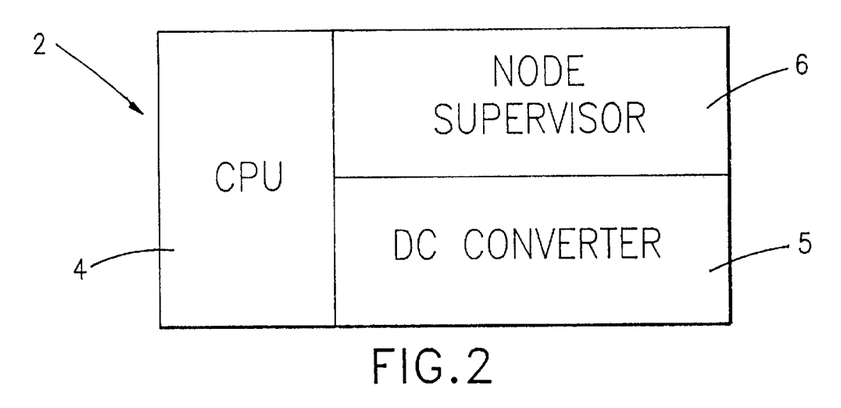
FIG. 2 is a schematic diagram of one computing subunit of the diagram of FIGS. 1A and 1B.

FIG. 1, comprising FIGS. 1A and 1B shows a schematic diagram of a supervisor system which is comprised of a plurality of subunits or nodes 2, one of which is shown in FIG. 2. Each subunit has a computing subcomponent 4, a subunit supervisor 6, also referred to herein as a node supervisor and a DC power convertor subcomponent 5. The computing subunit is referred to as a node.

The computing subunit 4, referred to in the figures as CPU 4, can be any suitable computer system. A typical computer system is an IBM RISC System/6000 which is described in "IBM RISC System/6000 Technology", International Business Machines Corporation, 1990, the teaching of which is incorporated herein by reference. This document refers to additional documents which describe this system, the teaching of those documents are incorporated herein by reference.

Figure 3:
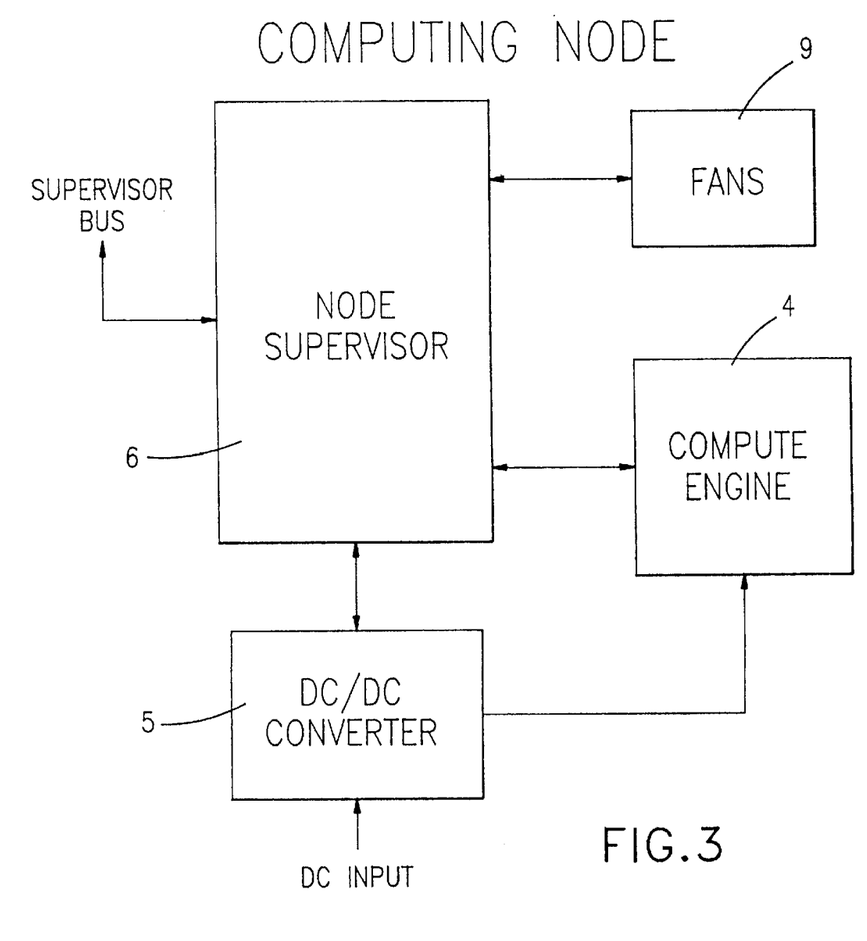
FIG. 3 is a schematic diagram of the subunit of FIG. 2 showing the electrical interconnection of the subcomponents.

As shown in FIG. 3, within processing node 2 of FIG. 1, there exists a node supervisor 6. This has connection to the computing subunit 4, as well as power, source 7 and air flow source 9. Each of the node processors 2 communicates over a common serial communications bus, the supervisor bus 8, which connects all 16 node processors as well as the frame supervisor 10 preferably within one equipment rack as shown in FIGS. 9–12. The serial bus is preferably the standard Signetics Inter- Integrated Circuit ($I^2C$) bus. The frame supervisor is connected to this serial bus, as well as to the operator console 12 over a standard RS-232 serial line. The bus 8 is daisy chained from computing subunit 2' to computing subunit 2". The functions of the node supervisor operate autonomously, as well as under program control from the frame supervisor 10. There is a set of default operations that will occur which may be superseded by command from input/output device 12 which is preferably an operator console.

The normal mode of operation of the system is to have the operator console 12 (also called "host") control the power and mode of the computer subunits 2. Upon applying power to the system, communications are established to the operator console 12. The console computer 12 will determine when computer subunits will power up, as well as the mode (normal, service, secure). If this communication link is not established, the frame supervisor 10 will default to a timed (staggered) start up of all computing subunits 2, in a normal mode. If communication from frame supervisor to node supervisors is not established, then each node supervisor defaults to power on, normal mode condition.

The computing subunit 2 also contains a DC convertor 5 which receives a distributed DC voltage (common to all subunits) and converts it to the lower voltage and power required to operate the components inside each subunit.

The supervisor system is distributed amongst the various processing nodes 2 as well as frame supervisor 10 of FIG. 1B which acts as a data logger and communications hub to the input/output device 12 of FIG. 1B which is preferably an operating console, such as IBM RS/6000 model 220.

The power distribution subunit 14 as shown in FIG. 1B contains an AC input 24, a power on/off switch 26 and an emergency power off circuit 28. The input power is carried by line 30 to the plurality of AC/DC convertors 16, 18, 20 and 22 (such as HC Power model HCT15). The Outputs of the AC/DC convertors are carried by line 32 to DC power distribution network 34 from which lines 36 carry power to each individual subcomponent 2. Power is carried by a standard three conductor shielded cable.

The system of FIGS. 1A and 1B has, in addition, a switching subunit 38 which contains a switch supervisor 40, a DC convertor 42 and a switching subcomponent 44. The switch is a separate subunit. In function, the switch is a high speed data communications network. This passes data between computing nodes. The switch supervisor and DC convertor function the same as node supervisor and convertor. Examples of a high speed switch useful to practice the present invention is manufactured by Ancor Corporation or Bit-3 Corporation.

Figure 4:
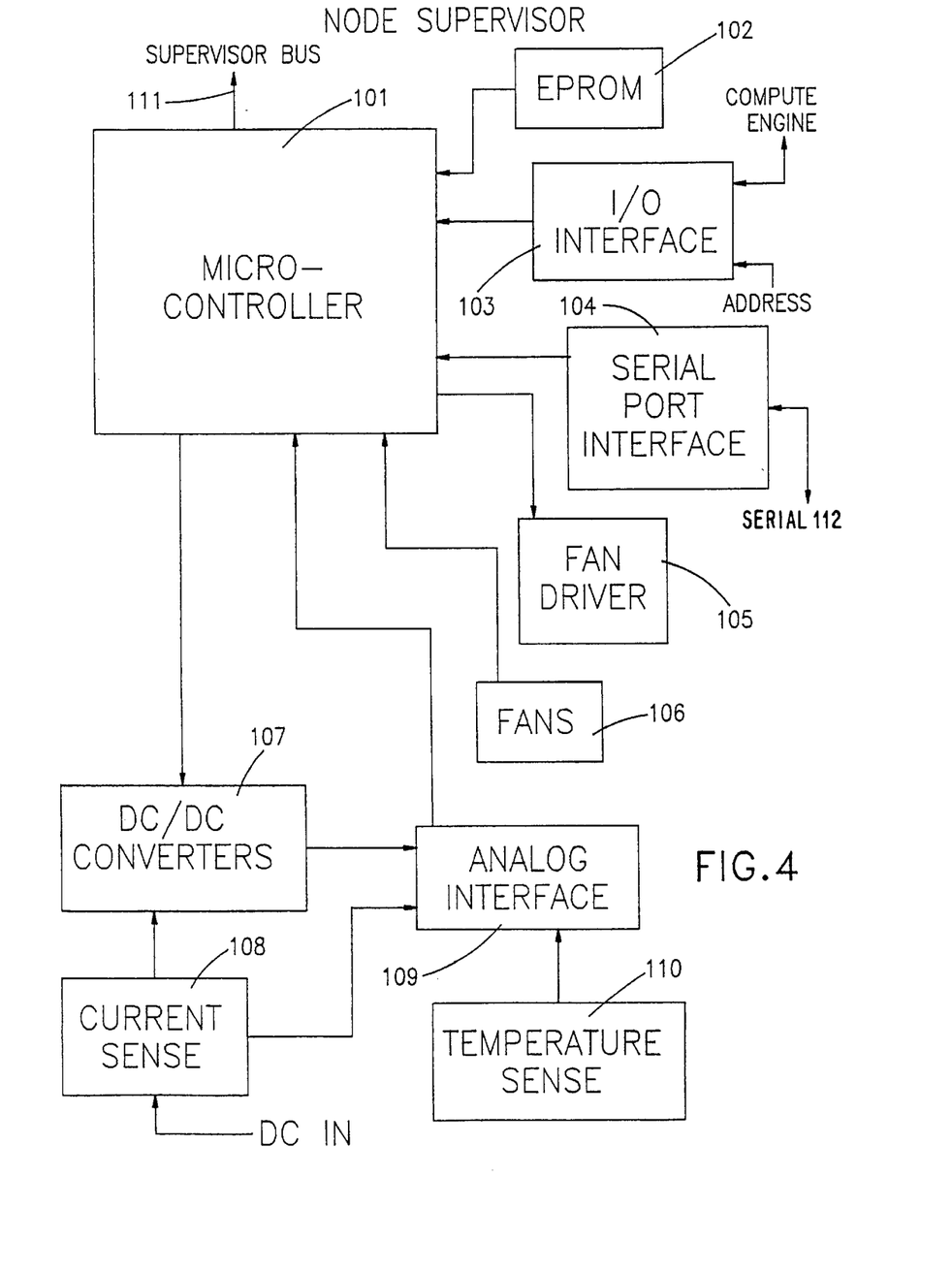
FIG. 4 is a schematic diagram of the node supervisor.

The node supervisor 10 is schematically shown in FIG. 4. The node supervisor 10 contains microcontroller 101 (e.g. Signetics 80C552) based with firmware (described herein below) in its internal EPROM 102 (e.g. AM27C256 from AMD). It provides a number of functions. These are: environmental control, environmental monitoring, computing subunit 4 functions and communications. The node environment consists of power and thermal conditions. The node supervisor 10 has control over the power converter 107 and cooling fans 106 (e.g. Panasonic Panaflow Series fan). It provides monitoring of the various system voltages, and temperatures 110 through a commonly available analog interface 109. It determines the speed of the cooling fans 106 by sensing fan rotation, and will determine proper operating levels, and take appropriate action by adjusting the fan driver 105 based on these parameters. The computing subunit 4 has reset, mode selection, power warning and control signals. These are provided by the supervisor card described herein below. Diagnostic display information, generated by the computing subunit 4 is communicated through the supervisor card to the input/output device 12. The serial link 112, used for control and monitoring, is also provided through the node supervisor card, through the serial port interface 104. All data from/to the node supervisor 6 passes through the supervisor bus 8 to the frame supervisor 10. The functions of the node supervisor 6 operate autonomously, as well as under program control from the frame supervisor 10. There is a set of default operations that will occur, which may be superseded by command from the input/output device 12, as described herein above.

Figure 5:
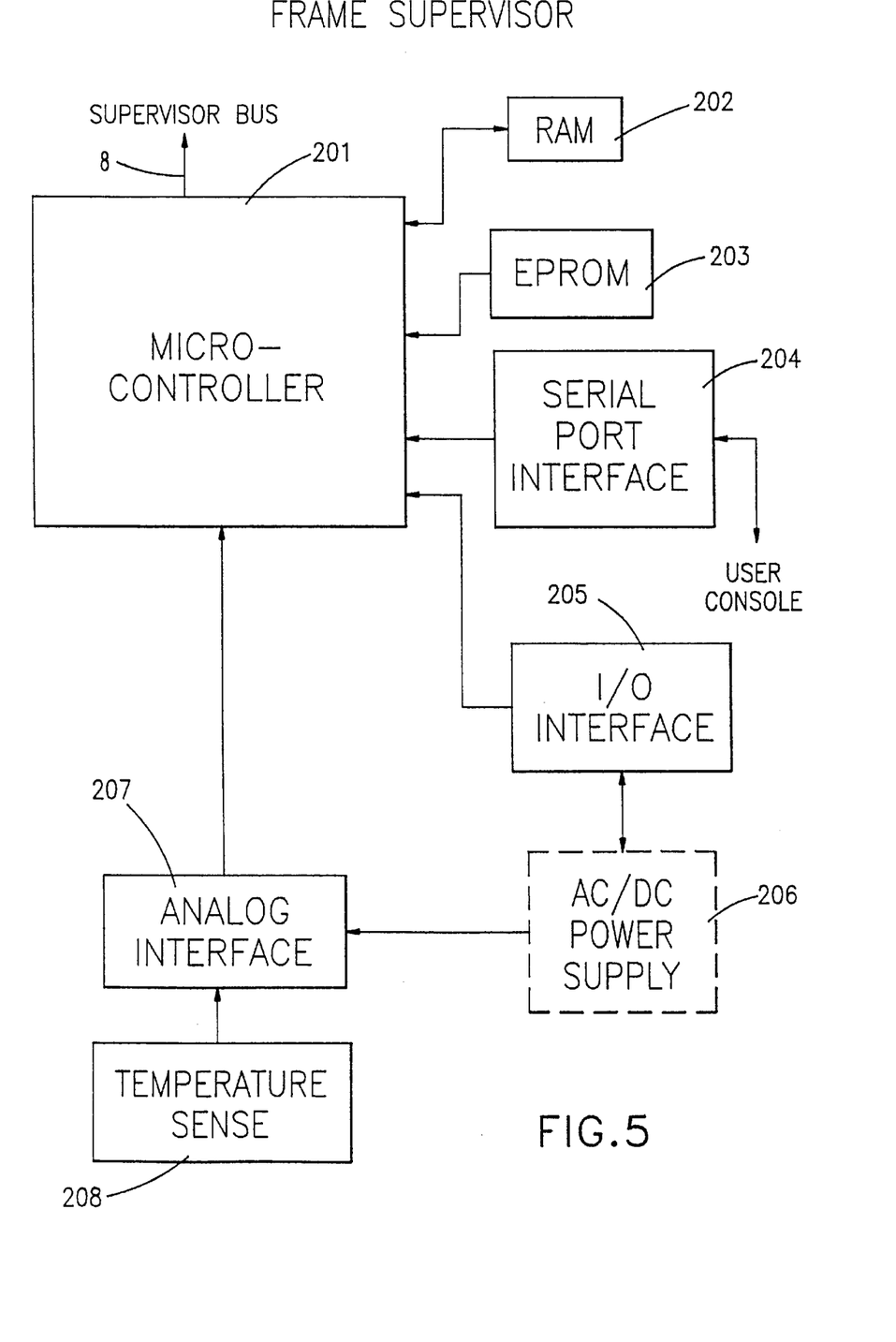
FIG. 5 is a schematic diagram of the frame supervisor.

FIG. 5 is a schematic diagram of the frame supervisor 10 of FIG. 1B. The frame supervisor provides similar functions as the node supervisor. There is control and monitoring of the main power supply (AC to DC) modules 16, 18, 20 and 22 (shown as 206 in FIG. 5). Each module is monitored for its output voltage and current, through the analog interface 207 and may be individually controlled by the frame supervisor 10 through the I/O interface 205. This device is also microcontroller based (e.g. Signetics 80C552) 201 with the firmware (described herein below) stored in EPROM (e.g. AM 27C256 from AMD) 203 and data stored in RAM (e.g. 62256 Hitachi) 202. Temperature in the power distribution box 14 is monitored by sensor 208. The frame supervisor 10 is the master controller on the supervisor bus 8 and is responsible for the polling of all the node supervisors. This is the main communications hub of the supervisor system, and it buffers and communicates supervisor data, as well as the individual computing subunit 4 serial communications data with the input/output device 12 through the serial port 204. As on the node supervisor 6, there is a default mode of autonomous operating parameters, which may be superseded by command from input/output device 12.

The node supervisor 6, switch supervisor 40 and frame supervisor 10 software code are written as a combination of "real-time" controller functions, and interrupt driven communications routines. The main components of the firmware are: foreground, background, supervisor bus communications, serial (RS-232) communications, as shown in the block diagram in FIG. 6.

Figure 6:
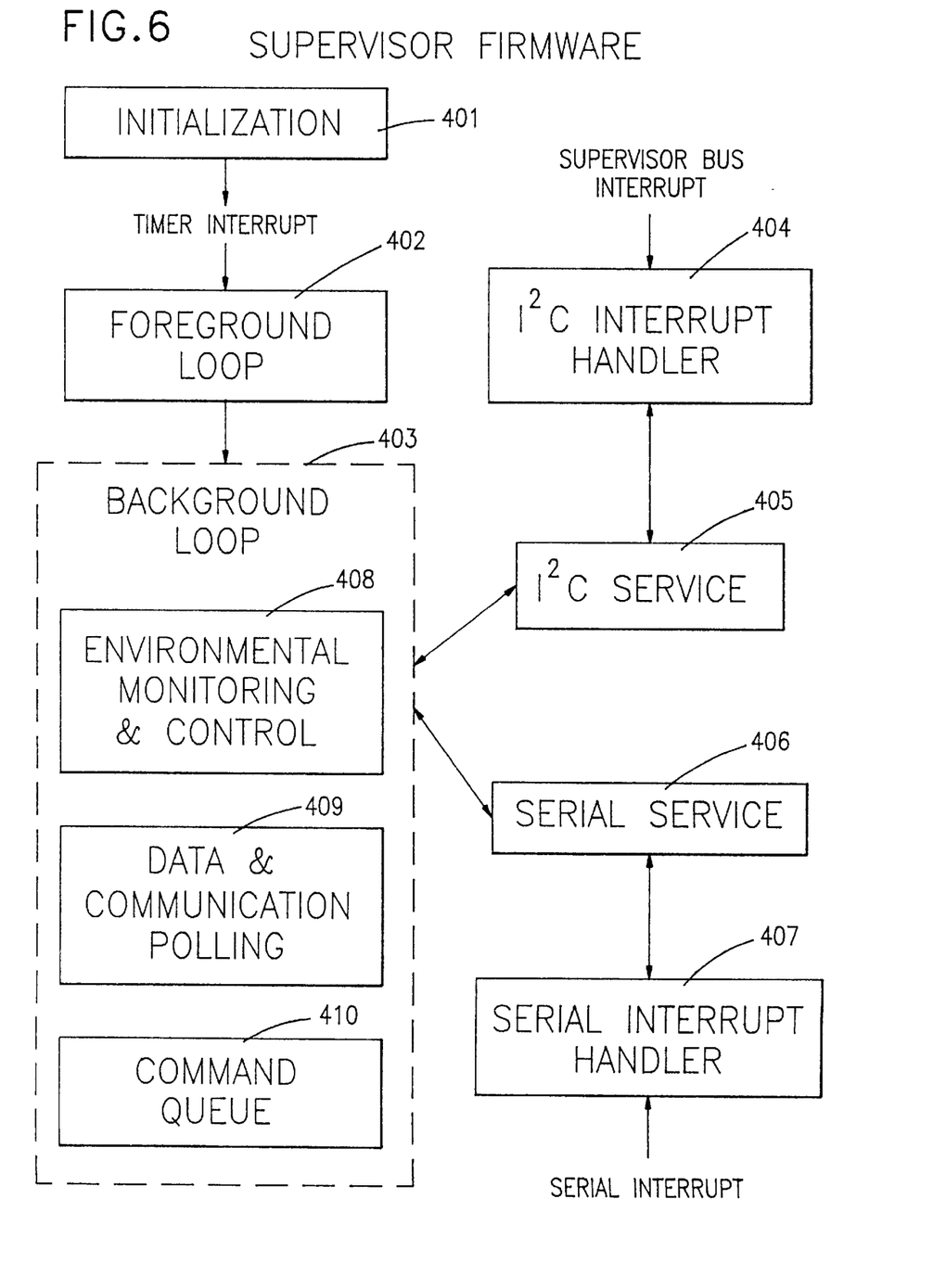
FIG. 6 is a schematic diagram of the supervisor firmware.

The initialization routine 401 is entered upon a power-on startup, or commanded reboot. The integrity of the supervisor is tested by the power on self test (POST) routines. These check the EPROM, RAM, and some internal ports. Initial values for the various communications and polling routines are set in this initialization routine 401.

The foreground routine 402 is entered by the real-time clock interrupt, every 1 ms. When activated, it disables other interrupts, and steps the counter for the background loop. Fan rotation is monitored in this routine in the node supervisors.

The background loop 403 is activated through the setting of a flag from the foreground loop. The three main sections are: environmental monitoring and control 408 data and communications polling 409 and command queue 410. Monitored parameters are acquired through the internal A/D converter, and include power supply voltages and currents, and temperature. In the node, a number of compute engine (computing subunit 4 on mode 2) functions are monitored, and fan speed is controlled as a function of internal temperature. The frame supervisor 10 sequentially polls each node for updates of all data within a variable time frame depending upon serial link 112 activity.

Supervisor bus communications (I²C communications) are handled at the hardware level by the I²C Interrupt Handler 404 (built into the Signetics 80C552) while higher level communications protocols are supported by the I²C Service routine 405. For the frame supervisor 10, the communications are as a bus master, while for the node supervisor, the operations are as a bus slave. (See I₂C bus description in the Signetics microcontroller data book, the teaching of which is incorporated herein by reference). Serial (RS-232) communications to the input/output device 12 from the frame supervisor 10 or to an internal computing subunit 4 from the node supervisor 6, uses the microcontroller built-in UART (Universal Asynchronous Receiver Transmitter) function. The Serial Interrupt handler 407 handles the RS-232 communications, and the Serial Service routine 406 supports the higher level functions.

In the node 2 the computing subunit 4 will generate an interrupt and have its data transferred to a buffer. This is then handled by the supervisor bus routines, to communicate the data to the frame supervisor 10. The frame supervisor 10 then passes the data from its buffer to the input/output device 12. Similarly, data from the input/output device 12 is passed through the frame supervisor 10, supervisor bus 8, and node supervisor 6 to its computing subunit 4. The data is interwoven with the supervisor data stream, which is constantly being polled.

The input/output device 12 communicates with the frame supervisor 10 over the serial communications link 46. Commands strings sent from the input/output device 12 to the frame supervisor 10 contain a control command to a node supervisor 6 or to a frame supervisor 10, or it will initiate a buffer download from the frame supervisor 10. The buffer data is parsed and displayed on a simulated front panel. Similarly, the serial data from the node 2 is sent to the input/output device 12 and displayed as on a normal RS/6000 operating console.

Figure 9:
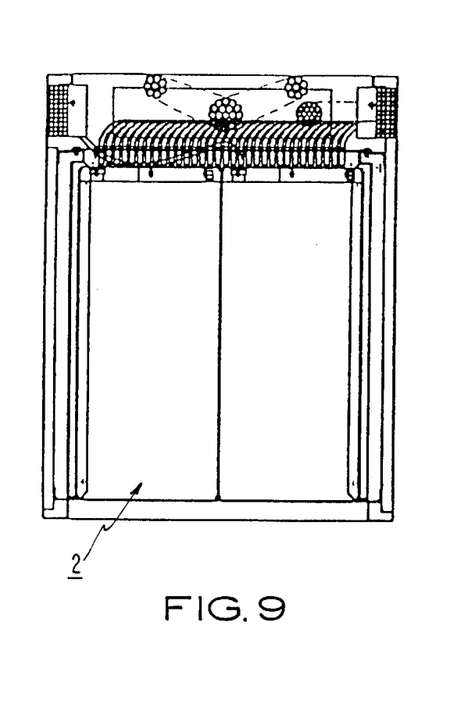
FIGS. 9–12 show a diagram of a top view, back view, side view and front view, respectively, of a specific embodiment of the system of FIGS. 1A and 1B.
Figure 10:
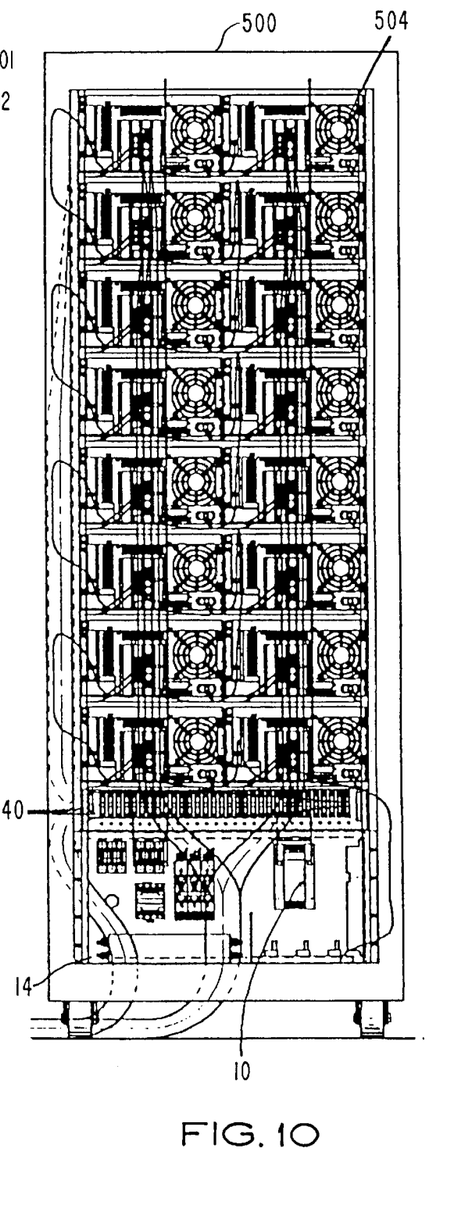
Figure 11:
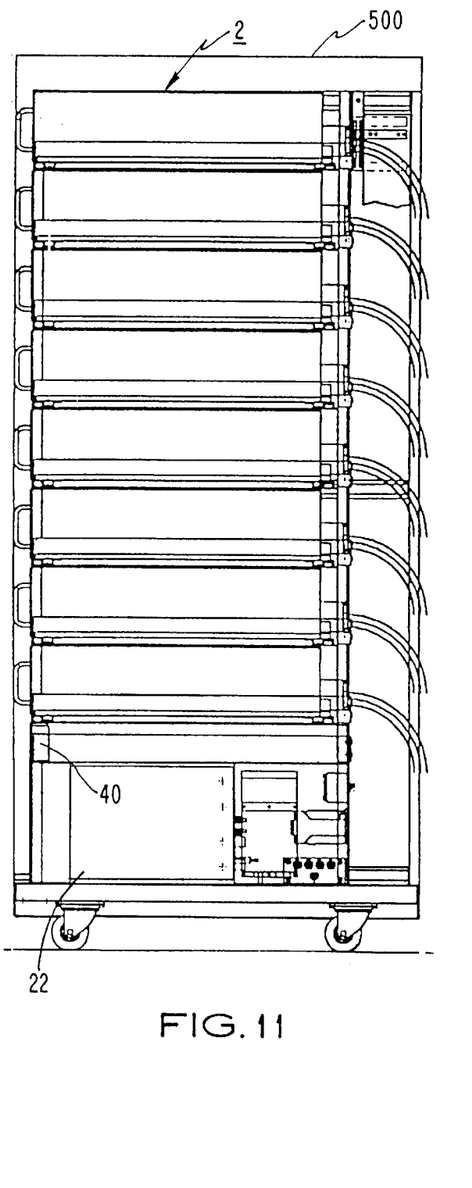
Figure 12:
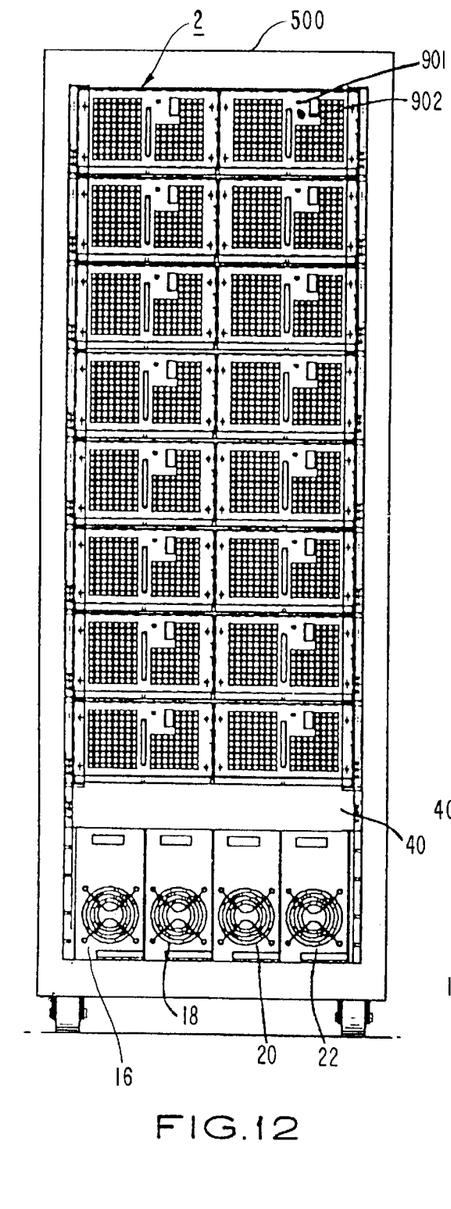

In the preferred embodiment, the system of FIGS. 1A and 1B is contained in a rack 500 which is shown in FIGS. 9–12. FIG. 9 shows a top view of the rack 500. FIG. 10 shows a back view of the rack 500. FIG. 11 shows a side view of the rack 500, FIG. 12 shows a front view of the rack 500. Rack 500 preferably contains 16 computing subunits 4 in two columns of 8. Frame supervisor 10 is mounted in the power distribution box 14 located behind the main power supply (16, 18, 20 and 22) at the bottom of the rack, and the switch supervisor 40 is located in a unit mounted below the computing subunits, and above the main power supply. The power distribution subunit 14 is at the bottom of the rack 500. The rack is typically on wheels 502 for easy movement. In FIG. 10, which shows the back of the rack, there are seen fan outputs 504, on each corresponding computer subunit 2. A plurality of frames having sixteen subunits can be interconnected each having its own input/output device on a shared input/output device.

Figure 7:
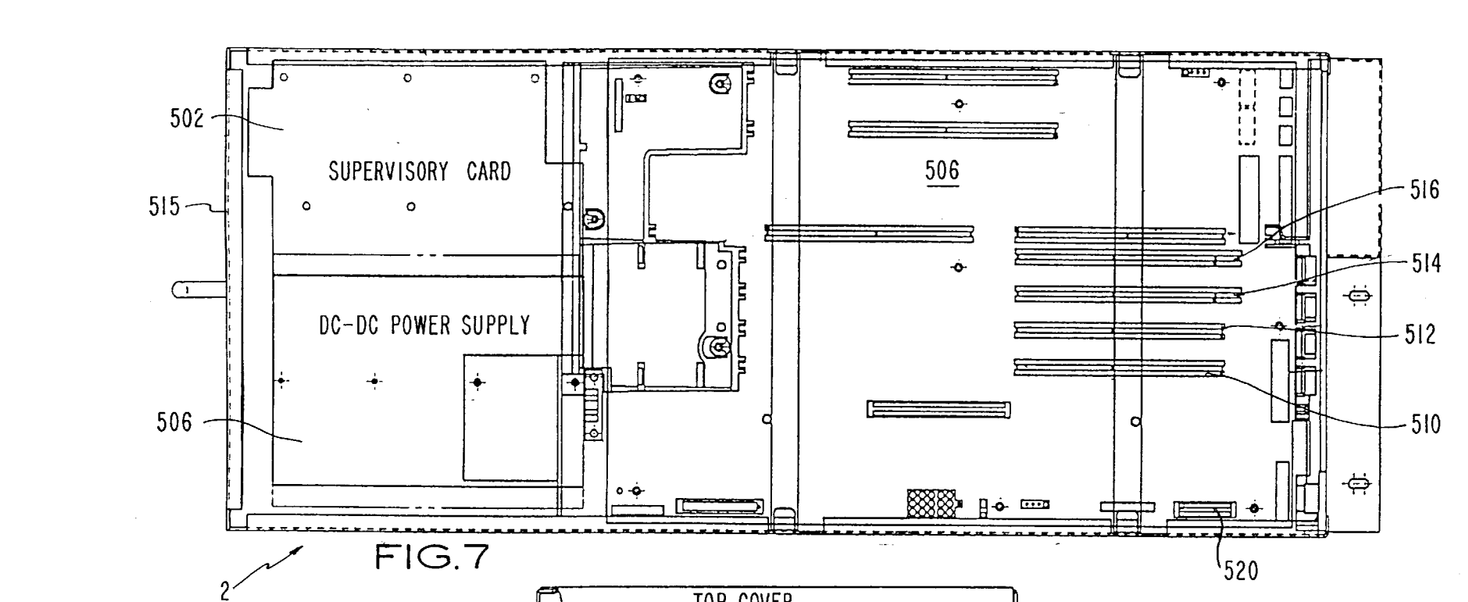
FIG. 7 is a top view of specific embodiment of the computing subunit.
Figure 8:
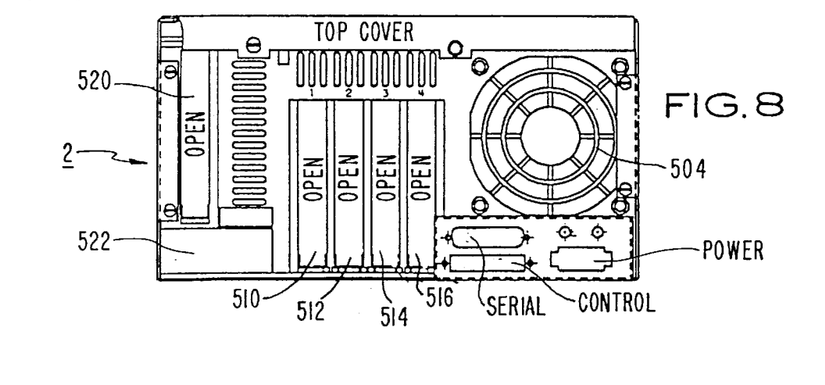
FIG. 8 is a back view of the embodiment of FIG. 7.

A specific embodiment of node or computing subunit 2 is shown in FIGS. 7 and 8. FIG. 7 is a top view and FIG. 8 is a rear view. As stated before, the node is the computing element in the system. Power is individually switchable, and a node can be removed and installed while the rest of the system is running. The physical environment of the node (its temperature, current draw, supply voltage, fan speed) and its diagnostic status are monitored by the built-in supervisor circuit in card 502 and reported to the frame supervisor 10, which, in turn reports to the user console 12.

The computing subunit 2 has the following principle components:

Node box 515: is a simple enclosure, designed to provide minimum volume for packing of all the necessary components.

Logic Circuits: the logic circuits are IBM RS/6000 Model 350 (50 MHz, 62.5 MHz, RS 2, . . . . ) The planar 506 has 4 microchannel slots 510, 512, 514 and 516 for accessory cards, as well as integrated Ethernet 520 and SCSI 522 ports. It can accommodate two 3.5" DASD (The DASD can be any of numerous units from many manufacturers. Example: P/N55F5206 from IBM) and two memory cards.

DC—DC Power Converter (or supply) 506 and node power distribution: The DC—DC power converter is a commercially available unit (Model No. VI-231-CY and VI-230-CV manufactured by Vicor, Inc.). It converts the centrally distributed 48 V DC input to the appropriate voltages supplying all the electrical requirements within the node box 515. The converter is controllable and can be shut-off from the central console 12 via the supervisor system. In addition, the node 2 is equipped with an electrical breaker, which acts as a mechanical on-off switch as well as a fuse device. The power-on status is indicated by a green LED (901) on the front panel. The DC—DC power converter (902) is integral with the node supervisor card 566 which distributes and monitors the power within the computing subunit 2.

Node supervisor Card 502 monitors the environment within the subunit 2.

Cooling: Essentially the same as RS 6000 Model 350 with the addition of one extra fan.

Rack Assembly:

AC-DC Power Subsystem The AC-DC power subsystem consists of four 1500 W AC-DC power supplies (16, 18, 20 and 22) in a hot-plug chassis. This configuration enables the removal and replacement of the individual supplies while the system is running. The AC-DC supplies step down 3-phase 208 VAC to 48 V DC. The DC power is then individually distributed to each of the computing subunits 4.

Power Distribution Unit and Related Circuits 14: These systems control the main power on-off circuit, and provide filtering and overload protection and emergency power-off functions for the entire system. All of the parts are standard, commercially available off-the-shelf items.

There is thus provided a new and improved system for monitoring of a cluster of computing subunits from a central console at which commands can be entered to provide control of each of the subunits.

While the present invention has been shown and described with respect to the specific embodiments, it will understood that it is not thus limited. Numerous modifications, changes and improvements will occur which fall within the scope and spirit of the invention.

We claim:

1. A computing system comprising:

a plurality of subunits;

each of said subunits being contained in a housing;

each of said subunit containing a subunit supervisor subcomponent and an independent computer;

each of said subunit supervisor subcomponents monitoring internal functioning of said subunit within which it is contained and generating signals corresponding thereto;

said housing containing a housing supervisor subunit adapted for receiving inputs from each of said subunit supervisor subcomponents; accumulating said signals; and outputting at least a part of said accumulated signals to an output device;

a central console for determining when each of said subunits will power up; and means for forming a communications link between said console and each of said subunits, if said communication link is not established, said housing supervisor subunit is adapted to default to a timed startup of each of said plurality of subunits, and further if communication from said housing supervisor subunit to each of said subunit supervisor subcomponents is not established, then each of said subunit supervisor subcomponents is adapted to default to power on, each of said subunit supervisor subcomponents being capable of operating autonomously.

2. A computing system according to claim 1 wherein said housing further includes a switching subunit for controlling communication between each of said subunits.

3. A computing system according to claim 1 wherein each of said subunits contains a power converter subcomponent, said subunit supervisor subcomponent has control over said power converter and said housing further includes a power supervisor for controlling power to each of said subunits.

4. A computing system according to claim 1 wherein said output device is a visual display device.

5. A computing system according to claim 1, further including an input device for providing inputs to said subunit supervisor subcomponents.

6. A computing system according to claim 1 wherein said housing is a frame, wherein said plurality of subunits and said housing supervisor subunit are drawers within said frame.

7. A computing system according to claim 5 wherein said output device and said input device are a console.

8. A computing system according to claim 7 wherein said console has a visual display for display of said output signals.

9. A computing system according to claim 1 wherein said internal functioning is selected from the group consisting of temperature, fan speed, voltages and currents.

10. A computing system comprising:

a plurality of subunits;

each of said subunits containing a subunit supervisor subcomponent and an independent computer;

each of said subunit supervisor subcomponents is adapted to monitor internal functioning of said subunit within which it is contained and to generate signals corresponding thereto;

a group supervisor subunit adapted to receive inputs from each of said subunit supervisor subcomponents; accumulate said signals; and output at least a part of said accumulated signals to an output device;

a central console for determining when each of said subunits will power up; and means for forming a communications link between said console and each of said subunits, wherein if said communication link is not established, said group supervisor subunit is adapted to default to a timed startup of each of said plurality of subunits, and if communication from said group supervisor subunit to each of said subunit supervisor subcomponents is not established, then each of said subunit supervisor subcomponents is adapted to default to power on, each of said subunit supervisor subcomponents being capable of operating autonomously.

11. A computing system comprising:

a plurality of subunits;

each of said subunits contains a subunit supervisor subcomponent, an independent computer, and a power converter subcomponent, said subunit supervisor subcomponent has control over said power converter;

wherein each of said subunit supervisor subcomponents monitors internal functioning of said subunit within which it is contained and generates signals corresponding thereto;

a group supervisor subunit which receives inputs from each of said subunit supervisor subcomponents;

a switching subunit for controlling communication between each of said subunits;

a power supervisor for controlling power to each of said subunits;

wherein said group supervisor subunit accumulates said signals; and outputs at least a part of said accumulated signals to an input/output device;

a central console for determining when each of said subunits will power up; and means for forming a communications link between said console and each of said subunits, wherein if said communication link is not established, said group supervisor subunit defaults to a timed startup of each of said plurality of subunits, and if communication from said group supervisor subunit to each of said subunit supervisor subcomponents is not established, then each of said subunit supervisor subcomponents defaults to power on, each of said subunit supervisor subcomponents being capable of operating autonomously.

12. A computing system according to claim 11, wherein said subunits are contained in a frame.

* * * * *